(12) United States Patent
Sawada

(10) Patent No.: US 10,700,343 B2
(45) Date of Patent: Jun. 30, 2020

(54) POSITIVE ELECTRODE FOR AIR BATTERY

(71) Applicant: Panasonic Intellectual Property Management Co., Ltd., Osaka (JP)

(72) Inventor: Koichi Sawada, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 130 days.

(21) Appl. No.: 16/155,848

(22) Filed: Oct. 9, 2018

(65) Prior Publication Data

US 2019/0148712 A1    May 16, 2019

(30) Foreign Application Priority Data

Nov. 16, 2017    (JP) .................................. 2017-221227

(51) Int. Cl.
| | |
|---|---|
| *H01M 4/133* | (2010.01) |
| *H01M 12/08* | (2006.01) |
| *H01M 4/86* | (2006.01) |
| *H01M 4/96* | (2006.01) |
| *H01M 4/02* | (2006.01) |

(52) U.S. Cl.
CPC ......... *H01M 4/133* (2013.01); *H01M 4/8605* (2013.01); *H01M 4/96* (2013.01); *H01M 12/08* (2013.01); *H01M 2004/021* (2013.01); *H01M 2004/028* (2013.01)

(58) Field of Classification Search
CPC ...... H01M 4/133; H01M 4/8605; H01M 4/96; H01M 12/08
See application file for complete search history.

(56) References Cited

U.S. PATENT DOCUMENTS 5,500,292 A  *  3/1996  Muranaka ............. H01M 4/926
                                                         180/65.1
2016/0064787 A1    3/2016  Koido et al.

FOREIGN PATENT DOCUMENTS

| JP | 2015-018679 | 1/2015 |
|---|---|---|
| JP | 2015-079576 | 4/2015 |
| JP | 2015-125830 | 7/2015 |
| JP | 2016-051704 | 4/2016 |
| JP | 2016-062817 | 4/2016 |

\* cited by examiner

*Primary Examiner* — Helen Oi K Conley
(74) *Attorney, Agent, or Firm* — McDermott Will & Emery LLP

(57) ABSTRACT

A positive electrode is for use in an air battery. The positive electrode includes a current collector including one or more openings, and an electroconductive layer including a porous body, the porous body including a carbon material. In the electroconductive layer, a second pore volume of a first region is greater than a second pore volume of a second region, wherein it is assumed that the electroconductive layer includes the first and second regions, the second region faces the one or more openings of the current collector, and the first region is located opposite to the second region with respect to a central plane containing midpoints in a thickness direction of the electroconductive layer.

7 Claims, 1 Drawing Sheet

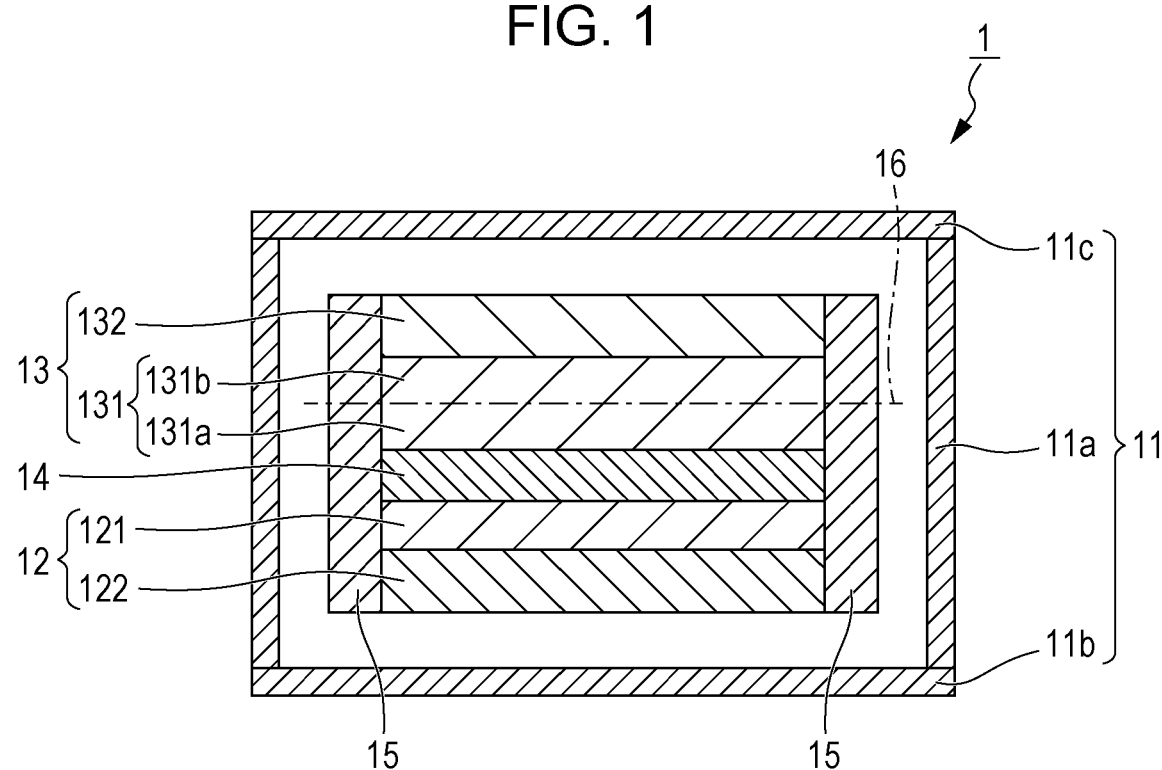
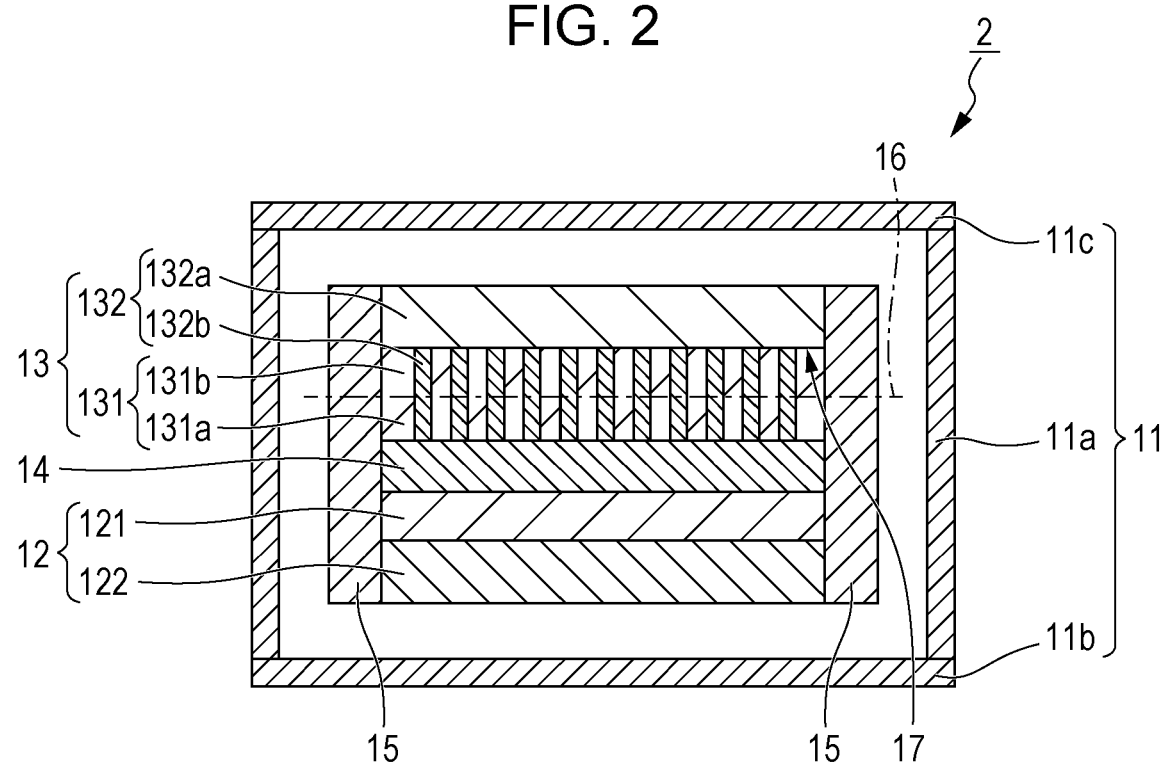

POSITIVE ELECTRODE FOR AIR BATTERY

BACKGROUND

1. Technical Field

The present disclosure relates to an air battery and a positive electrode for an air battery.

2. Description of the Related Art

An air battery offers advantages such as a high energy density (i.e., amount of dischargeable electric energy relative to weight) and easy miniaturization and weight reduction. Thus, air batteries are attracting attention as battery cells having an energy density greater than the energy density of metal ion cells, which are currently considered to have the highest energy density.

Air batteries include a positive electrode, a negative electrode, and an electrolyte layer disposed between the positive electrode and the negative electrode. The positive electrode is typically formed of an electrically conductive material. Examples of electrically conductive materials that may be used include carbon materials, such as graphite and acetylene black. For example, Japanese Unexamined Patent Application Publication No. 2015-79576 discloses an air battery including a positive electrode that has a structure in which a catalyst layer and a liquid-tight gas-permeable layer are laminated together. In the air battery, the catalyst layer is formed of a porous layer. The porous layer includes catalyst particles, a first material made of carbon and having a high specific surface area, a second material having a high aspect ratio, and a binder.

SUMMARY

One non-limiting and exemplary embodiment of the present disclosure provides a positive electrode for an air battery that enables realization of an air battery having a high discharge capacity.

In one general aspect, the techniques disclosed here feature a positive electrode for use in an air battery. The positive electrode includes a current collector including one or more openings, and an electroconductive layer including a porous body having pores, the porous body including a carbon material. In the electroconductive layer, a second pore volume of a first region is greater than a second pore volume of a second region, wherein it is assumed that the electroconductive layer includes the first and second regions, the second region faces the one or more openings of the current collector, and the first region is located opposite to the second region with respect to a central plane containing midpoints in a thickness direction of the electroconductive layer. Among the pores in the electroconductive layer, pores each having a pore diameter of 4 nm or more and less than 100 nm are designated as first pores, and pores each having a pore diameter of 100 nm or more and 10 μm or less are designated as second pores, and a cumulative pore volume of the first pores is designated as a first pore volume, and a cumulative pore volume of the second pores is designated as the second pore volume.

According to one general aspect of the present disclosure, the positive electrode for an air battery enables realization of an air battery having a high discharge capacity.

It should be noted that general or specific embodiments of the present disclosure may be implemented as a positive electrode, a battery, a device, a system, a method, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1 is a schematic cross-sectional view of an exemplary configuration of an air battery according to the present disclosure; and FIG. 2 is a schematic cross-sectional view of an exemplary configuration of an air battery according to the present disclosure, in which a positive electrode includes a current collector including a plurality of projections.

DETAILED DESCRIPTION

Underlying Knowledge Forming Basis of the Present Disclosure

An air battery is a battery cell using, as a positive electrode active material, oxygen from air and using, as a negative electrode active material, a metal or a metal compound capable of occluding and releasing metal ions. The positive electrode for an air battery including carbon and a binder disclosed in Japanese Unexamined Patent Application Publication No. 2015-79576 enables a high discharge capacity to be achieved. However, positive electrodes having a laminated structure such as the structure disclosed in Japanese Unexamined Patent Application Publication No. 2015-79576 have reduced discharge capacity in some cases. The present inventor conducted an analysis of positive electrodes after discharge to identify reasons for a reduction in discharge capacity. The present inventor found from the analysis that, in a region on the air intake side of the positive electrode, discharge products produced by the discharge reaction clog the porous body, which interferes with diffusion of oxygen into the positive electrode. The present inventor diligently performed studies to prevent a reduction in discharge capacity by facilitating diffusion of oxygen into the positive electrode and consequently arrived at an air battery and a positive electrode for an air battery of the present disclosure, which are described below.

Overview of One Aspect According to the Present Disclosure

A positive electrode according to a first aspect of the present disclosure is a positive electrode for an air battery. The positive electrode includes a current collector and an electroconductive layer including a porous body, the porous body including a carbon material. The electroconductive layer includes a first region and a second region. The first region is located opposite to the current collector with respect to a central plane containing midpoints in the thickness direction of the electroconductive layer. The second region is located adjacent to the current collector with respect to the central plane. The specific surface area of the carbon material included in the first region is higher than the specific surface area of the carbon material included in the second region. In the present disclosure, the carbon material is, for example, a powder that contains carbon. The specific surface area of the carbon material may be determined by, for example, measuring the powder carbon material prior to formation of the porous body. In the case that one region includes a plurality of layers and the specific surface areas of the carbon materials included in the plurality of layers are different from one another, the value obtained by averaging the specific surface areas of the plurality of layers in accordance with the contents of the respective carbon materials of the respective layers is designated as the specific surface area of the carbon material of the region.

In the positive electrode according to the first aspect, the specific surface area of the carbon material included in the first region is higher than the specific surface area of the carbon material included in the second region provided that a central plane containing midpoints in the thickness direction of the electroconductive layer is defined and the electroconductive layer is divided into the first region and the second region with the central plane being the interface. The first region is a region located opposite to the current collector with respect to the central plane. In other words, the first region is a region located closer to the negative electrode with respect to the central plane when the positive electrode according to the first aspect is included in an air battery. On the other hand, the second region is a region located opposite to the first region with respect to the central plane, that is, a region located adjacent to the current collector with respect to the central plane. In other words, the second region is a region forming the air intake side with respect to the central plane when the positive electrode according to the first aspect is included in an air battery. The positive electrode according to the first aspect has the configuration described above, and thus the positive electrode facilitates diffusion of oxygen into the positive electrode and consequently enables improvement in the discharge capacity. In the present disclosure, the central plane is a plane defined as a virtual plane, and the first and second regions are also each a region defined as a virtual region. Thus, in the case that the electroconductive layer includes a plurality of physical layers, the interface between adjacent layers may or may not coincide with the central plane.

According to a second aspect, the positive electrode according to the first aspect is as follows, for example. The first region and the second region in the electroconductive layer each include first pores having a pore diameter of 4 nm or more and less than 100 nm and second pores having a pore diameter of 100 nm or more and 10 µm or less. In the first region of the electroconductive layer and in the second region of the electroconductive layer, the second pore volume is greater than the first pore volume. The second pore volume is a cumulative pore volume of the second pores, and the first pore volume is a cumulative pore volume of the first pores.

The positive electrode according to the second aspect facilitates diffusion of oxygen into the positive electrode. Consequently, the positive electrode according to the second aspect improves the discharge capacity.

According to a third aspect, the positive electrode according to the first or second aspect is as follows, for example. The second pore volume of the first region is greater than the second pore volume of the second region.

The positive electrode according to the third aspect has the pore structure described above and thus facilitates diffusion of oxygen and metal ions in the first region. As a result, ions and oxygen can be efficiently supplied to the highly active material, which becomes deficient in oxygen and metal ions as the reaction progresses, that is, the high specific surface area carbon included in the first region, and consequently increased amounts of oxygen and metal ions can be activated. In addition, the second pores can be utilized as a space for storing the active material. That is, a space for storing large amounts of active material is provided in the first region, in which larger amounts of oxygen and metal ions can be activated than in the second region, and thus increased amounts of active material can be stored. Consequently, the positive electrode according to the third aspect further improves the discharge capacity.

According to a fourth aspect, the positive electrode according to any one of the first to third aspects is as follows, for example. The current collector includes a base and a plurality of projections disposed on at least a first major surface of the base. The electroconductive layer is disposed on the first major surface of the base, and the projections are at least partially within the electroconductive layer and in direct contact with inside of the electroconductive layer.

Because of the above-described configuration of the current collector, the positive electrode according to the fourth aspect can efficiently collect current and can further maintain the pore structure of the porous body of the electroconductive layer. Consequently, the positive electrode according to the fourth aspect has an increased reaction area and thus improves the discharge capacity.

According to a fifth aspect of the present disclosure, an air battery includes the positive electrode according to any one of the first to fourth aspects, a negative electrode that occludes and releases metal ions, and an electrolyte filling the space between the positive electrode and the negative electrode.

The air battery according to the fifth aspect includes the positive electrode according to any one of the first to fourth aspects and thus has improved discharge capacity.

According to a sixth aspect, the air battery according to the fifth aspect is as follows, for example. The electrolyte is a non-aqueous electrolyte solution.

The air battery according to the sixth aspect has high voltage and thus has a high weight energy density.

Embodiments of an air battery and a positive electrode for an air battery, of the present disclosure, will be described in detail below. The embodiments described below are merely illustrative, and the present disclosure is not limited to the embodiments described below.

An air battery of the present embodiment includes a positive electrode for an air battery (hereinafter referred to as "positive electrode"), a negative electrode capable of occluding and releasing metal ions, and an electrolyte disposed between the positive electrode and the negative electrode. The positive electrode includes a current collector including one or more openings and an electroconductive layer including a porous body including a carbon material. The electroconductive layer is a positive electrode layer that uses oxygen from air as a positive electrode active material and is capable of oxidizing and reducing oxygen. The current collector collects current from the electroconductive layer. The negative electrode includes a negative electrode layer capable of occluding and releasing metal ions. The negative electrode may further include a negative electrode current collector that collects current from the negative electrode layer. The air battery of the present embodiment may further include a separator disposed between the positive electrode and the negative electrode.

In the positive electrode of the present embodiment, the electroconductive layer includes a second region and a first region. The second region is located adjacent to and faces the one or more openings of the current collector with respect to a central plane containing midpoints in the thickness direction of the electroconductive layer. The first region is located opposite to the second region with respect to the central plane. The specific surface area of the carbon material included in the first region may be higher than the specific surface area of the carbon material included in the second region.

FIG. 1 is a schematic cross-sectional view of an exemplary configuration of the air battery described above. An air battery 1, illustrated in FIG. 1, includes a cell case 11, a negative electrode 12, a positive electrode 13, and an electrolyte 14. The electrolyte 14 is disposed between the negative electrode 12 and the positive electrode 13. The cell case 11 includes a tubular portion 11a, a bottom portion 11b, and a cover portion 11c. The tubular portion 11a has open ends at the top and the bottom. The bottom portion 11b closes the open end at the bottom of the tubular portion 11a. The cover portion 11c closes the open end at the top of the tubular portion 11a. Although not illustrated in the drawings, the cell case 11 has a configuration for intake of air. For example, the cover portion 11c may be provided with an air intake port for taking air into the cell case 11. The negative electrode 12 includes a negative electrode layer 121 and a negative electrode current collector 122. The negative electrode layer 121 is disposed adjacent to the negative electrode current collector 122, on the side adjacent to the electrolyte 14.

The positive electrode 13 includes an electroconductive layer 131 and a positive electrode current collector 132. The electroconductive layer 131 is disposed adjacent to the positive electrode current collector 132, on the side adjacent to the electrolyte 14. The electroconductive layer 131 includes a porous body including a carbon material and serves as a positive electrode layer. The positive electrode current collector 132 has a shape in a foil form, a plate form (e.g. flat plate form), or a mesh form. Although not illustrated in the drawing, the positive electrode current collector 132 is provided with one or more air intake holes (an example of the one or more openings of the present disclosure) for taking air into the electroconductive layer 131. For example, the positive electrode current collector 132 is in a foil form and includes one or more air intake holes or is in a plate form and includes one or more air intake holes. When the positive electrode current collector 132 has a mesh structure, for example, the openings of the mesh structure can serve as the air intake holes. A frame 15 is provided on the side surfaces of the laminate including the negative electrode 12, the electrolyte 14, and the positive electrode 13. Although not illustrated in the drawings, the air battery 1 may further include a separator included in the electrolyte 14.

For the electroconductive layer 131 of the positive electrode 13, a central plane 16 is defined as a virtual plane containing midpoints in the thickness direction of the electroconductive layer 131. In such a case, the electroconductive layer 131 includes a second region 131b and a first region 131a. The second region 131b is located adjacent to and faces the one or more air intake holes of the positive electrode current collector 132 with respect to the central plane 16. The first region 131a is located opposite to the second region 131b with respect to the central plane 16 containing midpoints. In other words, the first region 131a is a region constituting the side facing the negative electrode 12 with respect to the central plane 16, and the second region 131b is a region constituting the air intake side with respect to the central plane 16. The specific surface area of the carbon material included in the first region 131a may be higher than the specific surface area of the carbon material included in the second region 131b.

A lithium-air battery will now be described. The lithium-air battery is an example of the air battery of the present embodiment. The air battery of the present embodiment, however, is not limited to a lithium-air battery and may be an air battery using a metal other than lithium.

In the case that the air battery of the present embodiment is a lithium-air battery, the cell reaction is as follows. Discharge reaction (i.e., during use of cell)

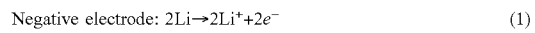

Negative electrode: $2Li \rightarrow 2Li^+ + 2e^-$ (1)

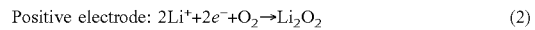

Positive electrode: $2Li^+ + 2e^- + O_2 \rightarrow Li_2O_2$ (2)

Charge reaction (i.e., during charging of cell)

Negative electrode: $2Li^+ + 2e^- \rightarrow 2Li$ (3)

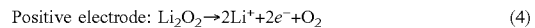

Positive electrode: $Li_2O_2 \rightarrow 2Li^+ + 2e^- + O_2$ (4)

As indicated by formulae (1) and (2), during discharging, the negative electrode releases electrons and lithium ions, whereas the positive electrode collects electrons while allowing oxygen, taken in from outside the cell, to react with lithium ions to produce lithium peroxide. In the case that the air battery is a lithium-air battery, the lithium peroxide is a discharge product. As indicated by formulae (3) and (4), during charging, the negative electrode collects electrons and lithium ions, whereas the positive electrode releases electrons, lithium ions, and oxygen. Alternatively, the air battery may use another lithium oxide (e.g., $Li_2O$) as a discharge product instead of lithium peroxide.

Next, the constituents of such an air battery will be described in detail.

1. Positive Electrode

As described above, the positive electrode includes the positive electrode current collector and the electroconductive layer. As described above, the electroconductive layer serves as a positive electrode layer that uses oxygen from air as a positive electrode active material and is capable of oxidizing and reducing oxygen. The electroconductive layer and the positive electrode current collector will be described below.

(1) Electroconductive Layer

The electroconductive layer uses oxygen from air as a positive electrode active material and includes a material capable of oxidizing and reducing oxygen. The electroconductive layer of the present embodiment includes a porous body including a carbon material, which is an example of the material capable of oxidizing and reducing oxygen. Carbon materials that may be used in such a porous body may have high electron conductivity. Specific examples of such carbon materials that may be used in the porous body may include carbon materials typically used as a conductive agent, such as acetylene black and Ketjen black. Examples of the carbon material used in the porous body may include carbon materials having a high specific surface area, such as activated carbon containing large amounts of surface functional groups and MgO-templated carbon. From among these carbon materials, one or more carbon materials may be selected from the standpoint of the specific surface area. For example, an electrically conductive carbon black, such as Ketjen black, and MgO-templated carbon may be mixed and used. The specific surface area of the carbon material may be, for example, 30 to 2000 $m^2/g$. When the specific surface area of the carbon material is within the above-described range, formation of the positive electrode layer, which has a specific pore structure, is facilitated. The pore structure will be described later. Here, the specific surface area is a value measured by the BET method.

In the electroconductive layer, the specific surface area of the carbon material included in the first region may be higher than the specific surface area of the carbon material included in the second region provided that the second region is defined as the portion that is adjacent to and faces the one or more openings of the positive electrode current collector with respect to the central plane containing midpoints in the thickness direction of the electroconductive layer, that is, the portion constituting the air intake side, and provided that the first region is defined as the portion opposite to the second region with respect to the central plane, that is, the portion that is adjacent to and faces the negative electrode. In other words, a porous body that is highly active, that is, in which the discharge reaction readily occurs, is provided in the first region, and a porous body that is not highly active, that is, in which the discharge reaction does not readily occur, is provided in the second region.

As described above, lithium peroxide is produced as a discharge product in the positive electrode during discharging. The lithium peroxide is produced in void portions of the electroconductive layer, that is, in the pores of the porous body. Positive electrodes of the related art have low permeability for oxygen, in other words, have high diffusion resistance. Consequently, in the electroconductive layer, lithium peroxide accumulates on the air intake side, which has a high oxygen concentration, and clog oxygen diffusion paths, which results in a reduction in discharge capacity. In contrast, in the positive electrode of the present embodiment, the specific surface area of the carbon material in the second region of the electroconductive layer, which is the air intake side, is low, and thus the reactivity in the second region of the electroconductive layer is low. Thus, in the porous body of the second region, the discharge reaction does not readily occur, and consequently, in the porous body of the second region, clogging by discharge products does not readily occur, and as a result, oxygen can be easily diffused. Accordingly, the positive electrode of the present embodiment facilitates oxygen diffusion in the thickness direction of the electroconductive layer, and as a result, improves the amount of deposition of lithium peroxide over the entire positive electrode, that is, improves the discharge capacity.

The first region and the second region of the electroconductive layer may each include pores having a pore diameter of 4 nm to 10 µm. Here, pores each having a pore diameter of 4 nm or more and less than 100 nm are designated as first pores, and pores each having a pore diameter of 100 nm or more and 10 µm or less are designated as second pores. Furthermore, the cumulative pore volume of the first pores is designated as a first pore volume and the cumulative pore volume of the second pores is designated as a second pore volume. In the present embodiment, in each of the first region and the second region of the electroconductive layer, the second pore volume may be greater than the first pore volume. That is, the pore volumes in the electroconductive layer may be such that the proportion of the second pores, which have larger pore diameters, is greater than the proportion of the first pores, which have smaller pore diameters. In addition, the second pore volume of the first region may be greater than the second pore volume of the second region.

The electroconductive layer may further include a binder for securing the porous body described above. The binder may be a material known in the art as a binder for a positive electrode layer of an air battery. Examples of such materials include polyvinylidene fluoride (PVDF) and polytetrafluoroethylene (PTFE). Although not particularly limited, the content of the binder in the electroconductive layer may be, for example, within a range of 1 mass % to 40 mass %.

The thickness of the electroconductive layer varies depending on the use and the like of the air battery and is thus not particularly limited. The thickness of the electroconductive layer may be, for example, within a range of 2 µm to 500 µm or within a range of 5 µm to 300 µm.

The method for forming the electroconductive layer may be, for example, the method described below. First, a coating composition in which a carbon material for the porous body to be included in the electroconductive layer, a binder, and a sublimation powder are dispersed in a solvent is prepared and formed into a film. The sublimation powder and the solvent are removed by performing a heat treatment, and thus a porous film including pores having the desired pore diameter is formed. Next, the porous film is, for example, pressure-bonded onto a positive electrode current collector, and thus the electroconductive layer is formed. The positive electrode current collector will be described below. The sublimation powder serves as a pore-forming agent. Thus, the porous film, produced as described above by using a sublimation powder, has the desired pore structure. In addition, in the electroconductive layer of the present embodiment, the specific surface area of the carbon material included in the first region is different from the specific surface area of the carbon material included in the second region, as described above. Such an electroconductive layer can be obtained as follows, for example. A plurality of porous films are produced, each from a carbon material for the porous body. The carbon materials are different from each other. The plurality of porous films are appropriately combined and laminated together. For example, the interface between any two adjacent porous films may or may not coincide with the central plane containing midpoints in the thickness direction of the electroconductive layer.

(2) Positive Electrode Current Collector

The positive electrode current collector collects current from the electroconductive layer. Thus, the material of the positive electrode current collector is not particularly limited provided that the material is electrically conductive, and accordingly the material may be a material known in the art as a material for a positive electrode current collector of an air battery. Examples of the material of the positive electrode current collector include stainless steel, nickel, aluminum, iron, titanium, and carbon. Examples of the shape of the positive electrode current collector include foil forms, plate forms, and mesh (e.g., grid) forms. Positive electrode current collectors in a mesh form have excellent current collection efficiency. The thickness of the positive electrode current collector may be, for example, within a range of 10 µm to 1000 µm or within a range of 20 µm to 400 µm. The cell case, which will be described later, may have multiple functions to serve as a positive electrode current collector.

The positive electrode current collector may be configured to include one or more projections. Such a positive electrode current collector may include a base and the one or more projections. The base may include a first major surface and a second major surface opposite to the first major surface. The one or more projections may be disposed on at least the first major surface of the base. For example, at least one or more of the plurality of projections may be disposed on a side surface of the positive electrode current collector. The base and the projections may be formed from the same material, or the material from which the base is formed may be different from the material from which the projections are formed. For example, the base may be in a foil form, a plate form (e.g. flat plate form), or the like or may have a mesh (e.g., grid) structure. The base may be in a foil form or in a plate form and include one or more air intake holes. When the base has a mesh structure, the positive electrode current collector has excellent current collection efficiency and an excellent ability to supply oxygen. The thickness of the base of the positive electrode current collector may be, for example, within a range of 10 µm to 1000 µm or within a range of 20 µm to 400 µm. Each of the projections has a columnar shape and projects from the first major surface of the base, on the side on which the electroconductive layer is to be disposed. When the positive electrode current collector including such one or more projections is used, the electroconductive layer is disposed on the positive electrode current collector in such a manner that the one or more projections extend into the electroconductive layer. In the positive electrode current collector including such one or more projections, when, for example, the electroconductive layer is formed by laminating a plurality of porous films together, the plurality of porous films can be secured by the one or more projections.

Each of the projections may have a height of 10% or more and 1000% or less the thickness of the electroconductive layer. The height of the projection corresponds to a length of the projection from the plane containing the first major surface of the base in a direction perpendicular to the plane. The height of each of the projections may be, for example, 30% or more the thickness of the electroconductive layer or 50% or more of the thickness. Furthermore, the height of each of the projections may be, for example, 500% or less the thickness of the electroconductive layer or 200% or less of the thickness.

FIG. 2 illustrates an example of a positive electrode including a positive electrode current collector including a plurality of projections and an example of an air battery including the positive electrode. The air battery 2, illustrated in FIG. 2, is the same as the air battery 1 illustrated in FIG. 1 except for the configuration of the positive electrode current collector. Accordingly, for the air battery 2, only the positive electrode current collector will be described. The positive electrode current collector 132 of the positive electrode 13 of the air battery 2 includes a base 132a and a plurality of columnar projections 132b. The columnar projections 132b are disposed on a first major surface 17 of the base 132a. Each of the projections 132b is at least partially within the electroconductive layer 131 and is in direct contact with inside of the electroconductive layer 131. In other words, the positive electrode 13 has a structure in which the plurality of projections 132b of the positive electrode current collector 132 extend into the electroconductive layer 131. Although not illustrated in the drawings, the base 132a of the positive electrode current collector 132 is provided with air intake holes for taking air into the electroconductive layer 131. When the base 132a has a mesh structure, for example, the openings of the mesh structure can serve as the air intake holes.

2. Negative Electrode

As described above, the negative electrode includes a negative electrode layer and may further include a negative electrode current collector. The negative electrode layer and the negative electrode current collector will be described below.

(1) Negative Electrode Layer

The negative electrode layer of the present embodiment at least includes a negative electrode active material capable of occluding and releasing lithium ions. The negative electrode active material is not particularly limited provided that the material contains lithium. Examples of such materials include elemental lithium (i.e., metal), lithium metal alloys, lithium-containing oxides, and lithium-containing nitrides.

Examples of lithium metal alloys include lithium aluminum alloys, lithium tin alloys, lithium lead alloys, and lithium silicon alloys. Examples of lithium-containing oxides include lithium titanium oxides. Examples of lithium-containing nitrides include lithium cobalt nitrides, lithium iron nitrides, and lithium manganese nitrides.

The negative electrode layer may consist of a negative electrode active material. Alternatively, the negative electrode layer may include a binder in addition to the negative electrode active material. For example, when the negative electrode active material is in a foil form, the negative electrode layer may consist of the negative electrode active material. On the other hand, when the negative electrode active material is in a powder form, the negative electrode layer may include the negative electrode active material and a binder. The binder may be a material known in the art as a binder for a negative electrode layer of a lithium-air battery. Examples of such materials include PVDFs and PTFEs. Although not particularly limited, the content of the binder in the negative electrode layer may be, for example, within a range of 1 mass % to 40 mass %. Examples of methods for forming the negative electrode layer by using a negative electrode active material in a powder form include forming methods using, for example, a doctor blade method or pressure bonding.

(2) Negative Electrode Current Collector

The negative electrode current collector collects current from the negative electrode layer. The material of the negative electrode current collector is not particularly limited provided that the material is electrically conductive, and accordingly the material may be a material known in the art as a material for a negative electrode current collector of an air battery. Examples of the material of the negative electrode current collector include copper, stainless steel, nickel, and carbon. Examples of the shape of the negative electrode current collector include foil forms, plate forms, and mesh (e.g., grid) forms. In the present embodiment, the cell case, which will be described later, may have multiple functions to serve as a negative electrode current collector.

3. Separator

The air battery of the present embodiment may include a separator disposed between the electroconductive layer of the positive electrode and the negative electrode layer of the negative electrode. When a separator is disposed between the positive electrode and the negative electrode, the cell provides a high level of safety. The separator is not particularly limited provided that the separator has a function of electrically separating the electroconductive layer from the negative electrode layer. The separator may include, for example, a porous insulating material. Examples of such a porous insulating material include porous membranes each including, for example, polyethylene (PE) or polypropylene (PP), resin nonwoven fabrics each including, for example, PE or PP, nonwoven glass fiber fabrics, and nonwoven paper fabrics.

The separator may have a porosity within a range of 30 to 90%. When the porosity is 30% or more, the separator is able to hold an electrolyte sufficiently. Furthermore, when the porosity is 90% or less, the strength of the separator is sufficient. The porosity of the separator may be within a range of 35 to 60%.

The separator may be disposed within the electrolyte. In the case that the positive electrode current collector is provided with a plurality of projections, at least one or more of the plurality of projections may be in contact with the separator.

4. Electrolyte

The electrolyte is disposed between the electroconductive layer of the positive electrode and the negative electrode layer of the negative electrode and transports lithium ions. Thus, the form of the electrolyte is not particularly limited provided that the electrolyte is lithium ion-conductive (i.e., a lithium ion conductor). The electrolyte may be a solution system or a solid membrane system. Representative examples of the solution system include organic solvent systems each including a lithium salt. Representative examples of the solid membrane system include solid polymer electrolyte systems each including a lithium salt.

In the case that the electrolyte is a solution system, the electrolyte may include a non-aqueous electrolyte solution prepared by dissolving a lithium salt in a non-aqueous solvent.

Examples of lithium salts that may be included in the non-aqueous electrolyte solution include lithium perchlorate ($LiClO_4$), lithium hexafluorophosphate ($LiPF_6$), lithium tetrafluoroborate ($LiBF_4$), lithium trifluoromethanesulfonate ($LiCF_3SO_3$), and lithium bis(trifluoromethanesulfonyl)amide ($LiN(CF_3SO_2)_2$). The lithium salt included in the non-aqueous electrolyte solution is not limited to the materials mentioned above and may be a lithium salt known in the art as an electrolyte for a non-aqueous electrolyte solution of an air battery.

The amount of dissolution of the electrolyte with respect to a non-aqueous solvent is, for example, 0.5 to 2.5 mol/l. In the case that a solution system electrolyte (e.g., non-aqueous electrolyte solution) is used, the non-aqueous electrolyte solution may be impregnated into the separator to be held by the separator, as described above, so that the electrolyte can be formed.

The non-aqueous solvent may be a non-aqueous solvent known in the art as a non-aqueous solvent for a non-aqueous electrolyte solution of an air battery. The solvent may be, among others, a chain ether, such as tetraethylene glycol dimethyl ether. This is because chain ethers are not susceptible to a side reaction, other than the oxidation-reduction reaction of oxygen, in the positive electrode compared with carbonate-based solvents.

5. Cell Case

The cell case for the air battery of the present embodiment is not particularly limited provided that the cell case can house the positive electrode, the negative electrode, and the electrolyte, described above. Thus, the cell case for the air battery of the present embodiment is not limited to the cell case 11 illustrated in FIGS. 1 and 2 and may be a cell case of any of a variety of types, such as a coin type, a flat plate type, a cylindrical type, and a laminate type. The cell case may be a cell case of an atmosphere-exposed type or may be a cell case of a sealed type. The atmosphere-exposed-type cell case is a case that has an air opening through which air can flow in and out and thus allows air to contact the positive electrode. On the other hand, in the instance that the case is a sealed-type cell case, the sealed-type cell case may be provided with a gas (e.g., air) supply tube and a gas (e.g., air) exhaust tube. In such an instance, the gas to be supplied and exhausted may be dry. The gas may have a high oxygen concentration or may be pure oxygen (99.999%). The oxygen concentration may be increased during discharging and the oxygen concentration may be reduced during charging.

As described above, in the present embodiment, the detailed description refers to an example in which the air battery is a lithium-air battery; however, the air battery of the present disclosure may be employed as an air battery using a different metal, for example, as a sodium-air battery or a magnesium-air battery.

EXAMPLES

In the following description, the present disclosure will be described in more detail by way of examples. The positive electrodes and air batteries described below were produced as samples and are merely illustrative. The present disclosure is not limited to the positive electrodes and air batteries described below.

Sample 1

The positive electrode current collector used was a structure made of SUS316 stainless steel. The structure included a base having a mesh structure and a plurality of projections disposed on a first major surface of the base. The thickness of the base was 100 µm. Each of the projections extended in a direction perpendicular to the first major surface of the base. Each of the projections was a cylinder with a 200 µm height, with the bottom surface being circular and 200 µm in diameter. The plurality of projections were disposed with a distance between adjacent projections of 2400 µm.

Next, an electroconductive layer was produced. KETJENBLACK EC600JD, manufactured by Lion Specialty Chemicals Co., Ltd., and Porous Carbon CNovel P(3)010, manufactured by Toyo Tanso Co., Ltd., were used as carbon materials for forming the carbon material-containing porous body. KETJENBLACK EC600JD, CNovel, Newcol 1308-FA (90), and Fumaric acid were mixed and stirred to obtain a mixture. Newcol 1308-FA (90), manufactured by Nippon Nyukazai Co., Ltd, was used as a surfactant solution. Fumaric acid, manufactured by NIPPON SHOKUBAI CO., LTD, was used as a sublimation powder that served as a pore-forming agent. The fumaric acid was ground into a powder form in advance in a jet mill and used as a sublimation powder. The mass ratio between KETJENBLACK EC600JD, CNovel, and the sublimation powder was 4.4: 3.3:33 in the order stated. The resultant mixture was cooled, and thereafter Fluon® PTFE AD911E, a binder manufactured by Asahi Glass Co., Ltd., was added to the mixture, and the mixture was stirred again. The binder was added in an amount such that the mass ratio between the carbon material (here, combination of KETJENBLACK EC600JD and CNovel) and the binder was 7:3 in the order stated. The resultant mixture was rolled in a roll press to produce a first sheet. The resultant first sheet was fired at 320° C. in a firing furnace to remove moisture, the surfactant, and the sublimation powder. The first sheet was rolled in the roll press again to adjust the thickness to 200 µm.

Furthermore, a second sheet was produced using the same procedure as with the first sheet except that Acetylene black HS-100L, manufactured by Denka Company Limited, was used as the carbon material. The pore diameter distributions of the first sheet and the second sheet were determined using a method described later. In addition, the first pore volume and the second pore volume were determined from the obtained pore diameter distributions. Furthermore, the specific surface area of the carbon material used to produce the first sheet and the specific surface area of the carbon material used to produce the second sheet were determined using a method described later. The first sheet and the second sheet were overlaid onto each other in such a manner that the first sheet formed the first region and the second sheet formed the second region. Thus, the electroconductive layer was produced. The laminate made of the first sheet and the second sheet is an example of the electroconductive layer and an example of the porous body included in the electroconductive layer. Next, pressure bonding was performed in such a manner that the plurality of projections formed on the positive electrode current collector extended into the first sheet and the second sheet. Thus, the positive electrode was produced.

The non-aqueous electrolyte solution used was a solution prepared by dissolving lithium bis(trifluoromethanesulfonyl)amide (LiTFSA, manufactured by KISHIDA CHEMICAL Co., Ltd.), which was used as an electrolyte, in tetraethylene glycol dimethyl ether (TEGDME, manufactured by KISHIDA CHEMICAL Co., Ltd.), a non-aqueous solvent. The non-aqueous electrolyte solution was obtained by adding, to TEGDME, LiTFSA to a concentration of 1 mol/L and stirring the resultant overnight in a dry air atmosphere with a dew point of −50° C. or lower to accomplish mixing and dissolving. The separator used was a glass fiber separator. Lithium metal (manufactured by The Honjo Chemical Corporation) was used as the negative electrode layer. A SUS304 stainless steel (manufactured by The Nilaco Corporation), which served as the negative electrode current collector, was attached to the negative electrode layer, and the resultant was used as the negative electrode. The positive electrode, the separator, the non-aqueous electrolyte solution, and the negative electrode were arranged in a manner illustrated in FIG. 1. Thus, an air battery was produced. A discharge test was conducted on the produced air battery. The results of the discharge test conducted on the air battery are shown in Table 1. In Table 1, the specific surface area of the carbon material of the first sheet, the first pore volume of the first sheet, and the second pore volume of the first sheet are shown as the specific surface area of the carbon material of the first region, the first pore volume of the first region, and the second pore volume of the first region, respectively. In addition, in Table 1, the specific surface area of the carbon material of the second sheet, the first pore volume of the second sheet, and the second pore volume of the second sheet are shown as the specific surface area of the carbon material of the second region, the first pore volume of the second region, and the second pore volume of the second region, respectively.

Sample 2

A first sheet was produced using the same method as with the first sheet of sample 1 except that KETJENBLACK EC600JD alone was used as the carbon material and the mass ratio between KETJENBLACK EC600JD and the binder was 7:3 in the order stated. In addition, the second sheet was produced using the same method as with the second sheet of sample 1. A positive electrode and an air battery were produced using the same method as with sample 1 except that the first sheet and the second sheet produced as described above were used. The results of the discharge test conducted on the air battery are shown in Table 1. In Table 1, the specific surface area of the carbon material of the first sheet, the first pore volume of the first sheet, and the second pore volume of the first sheet are shown as the specific surface area of the carbon material of the first region, the first pore volume of the first region, and the second pore volume of the first region, respectively. In addition, in Table 1, the specific surface area of the carbon material of the second sheet, the first pore volume of the second sheet, and the second pore volume of the second sheet are shown as the specific surface area of the carbon material of the second region, the first pore volume of the second region, and the second pore volume of the second region, respectively.

Sample 3

A first sheet was produced using the same method as with the first sheet of sample 1 except that KETJENBLACK EC600JD alone was used as the carbon material and the mass ratio between KETJENBLACK EC600JD and the binder was 7:3 in the order stated. In addition, a second sheet was produced using the same method as with the second sheet of sample 1 except that KETJENBLACK ECP300J, manufactured by Lion Specialty Chemicals Co., Ltd., was used as the carbon material and the mass ratio between KETJENBLACK ECP300J and the binder was 7:3 in the order stated. A positive electrode and an air battery were produced using the same method as with sample 1 except that the first sheet and the second sheet produced as described above were used. The results of the discharge test conducted on the air battery are shown in Table 1. In Table 1, the specific surface area of the carbon material of the first sheet, the first pore volume of the first sheet, and the second pore volume of the first sheet are shown as the specific surface area of the carbon material of the first region, the first pore volume of the first region, and the second pore volume of the first region, respectively. In addition, in Table 1, the specific surface area of the carbon material of the second sheet, the first pore volume of the second sheet, and the second pore volume of the second sheet are shown as the specific surface area of the carbon material of the second region, the first pore volume of the second region, and the second pore volume of the second region, respectively.

Sample 4

A first sheet and a second sheet were produced using the same method as with the first sheet of sample 1 except that KETJENBLACK EC600JD alone was used as the carbon material and the mass ratio between KETJENBLACK EC600JD and the binder was 7:3 in the order stated. A positive electrode and an air battery were produced using the same method as with sample 1 except that the first sheet and the second sheet produced as described above were used. The results of the discharge test conducted on the air battery are shown in Table 1. In Table 1, the specific surface area of the carbon material of the first sheet, the first pore volume of the first sheet, and the second pore volume of the first sheet are shown as the specific surface area of the carbon material of the first region, the first pore volume of the first region, and the second pore volume of the first region, respectively. In addition, in Table 1, the specific surface area of the carbon material of the second sheet, the first pore volume of the second sheet, and the second pore volume of the second sheet are shown as the specific surface area of the carbon material of the second region, the first pore volume of the second region, and the second pore volume of the second region, respectively.

Sample 5

A first sheet was produced using the same method as with the first sheet of sample 1 except that KETJENBLACK ECP300J was used as the carbon material and the mass ratio between KETJENBLACK ECP300J and the binder was 7:3 in the order stated. A second sheet was produced using the same method as with the second sheet of sample 1 except that KETJENBLACK EC600JD was used as the carbon material and the mass ratio between KETJENBLACK EC600JD and the binder was 7:3 in the order stated. A positive electrode and an air battery were produced using the same method as with sample 1 except that the first sheet and the second sheet produced as described above were used. The results of the discharge test conducted on the air battery are shown in Table 1. In Table 1, the specific surface area of the carbon material of the first sheet, the first pore volume of the first sheet, and the second pore volume of the first sheet are shown as the specific surface area of the carbon material of the first region, the first pore volume of the first region, and the second pore volume of the first region, respectively. In addition, in Table 1, the specific surface area of the carbon material of the second sheet, the first pore volume of the second sheet, and the second pore volume of the second sheet are shown as the specific surface area of the carbon material of the second region, the first pore volume of the second region, and the second pore volume of the second region, respectively.

Sample 6

A first sheet was produced using the same method as with the first sheet of sample 1 except that Acetylene black HS-100L was used as the carbon material and the mass ratio between Acetylene black HS-100L and the binder was 7:3 in the order stated. A second sheet was produced using the same method as with the second sheet of sample 1 except that KETJENBLACK EC600JD and CNovel were used as the carbon material and the mass ratio between KETJEN-BLACK EC600JD, CNovel, and the binder was 4:3:3 in the order stated. A positive electrode and an air battery were produced using the same method as with sample 1 except that the first sheet and the second sheet produced as described above were used. The results of the discharge test conducted on the air battery are shown in Table 1. In Table 1, the specific surface area of the carbon material of the first sheet, the first pore volume of the first sheet, and the second pore volume of the first sheet are shown as the specific surface area of the carbon material of the first region, the first pore volume of the first region, and the second pore volume of the first region, respectively. In addition, in Table 1, the specific surface area of the carbon material of the second sheet, the first pore volume of the second sheet, and the second pore volume of the second sheet are shown as the specific surface area of the carbon material of the second region, the first pore volume of the second region, and the second pore volume of the second region, respectively.

Sample 7

A first sheet and a second sheet were produced using the same method as with the first sheet of sample 1 except that KETJENBLACK ECP300J was used as the carbon material and the mass ratio between KETJENBLACK ECP300J and the binder was 7:3 in the order stated. A positive electrode and an air battery were produced using the same method as with sample 1 except that the first sheet and the second sheet produced as described above were used. The results of the discharge test conducted on the air battery are shown in Table 1. In Table 1, the specific surface area of the carbon material of the first sheet, the first pore volume of the first sheet, and the second pore volume of the first sheet are shown as the specific surface area of the carbon material of the first region, the first pore volume of the first region, and the second pore volume of the first region, respectively. In addition, in Table 1, the specific surface area of the carbon material of the second sheet, the first pore volume of the second sheet, and the second pore volume of the second sheet are shown as the specific surface area of the carbon material of the second region, the first pore volume of the second region, and the second pore volume of the second region, respectively.

Sample 8

A first sheet was produced using the same method as with the first sheet of sample 1 except that Acetylene black HS-100L was used as the carbon material and the mass ratio between Acetylene black HS-100L and the binder was 7:3 in the order stated. A second sheet was produced using the same method as with the second sheet of sample 1 except that KETJENBLACK EC600JD was used as the carbon material and the mass ratio between KETJENBLACK EC600JD and the binder was 7:3 in the order stated. A positive electrode and an air battery were produced using the same method as with sample 1 except that the first sheet and the second sheet produced as described above were used. The results of the discharge test conducted on the air battery are shown in Table 1. In Table 1, the specific surface area of the carbon material of the first sheet, the first pore volume of the first sheet, and the second pore volume of the first sheet are shown as the specific surface area of the carbon material of the first region, the first pore volume of the first region, and the second pore volume of the first region, respectively. In addition, in Table 1, the specific surface area of the carbon material of the second sheet, the first pore volume of the second sheet, and the second pore volume of the second sheet are shown as the specific surface area of the carbon material of the second region, the first pore volume of the second region, and the second pore volume of the second region, respectively.

Sample 9

A first sheet and a second sheet were produced using the same method as with the first sheet of sample 1 except that Acetylene black HS-100L was used as the carbon material and the mass ratio between Acetylene black HS-100L and the binder was 7:3 in the order stated. A positive electrode and an air battery were produced using the same method as with sample 1 except that the first sheet and the second sheet produced as described above were used. The results of the discharge test conducted on the air battery are shown in Table 1. In Table 1, the specific surface area of the carbon material of the first sheet, the first pore volume of the first sheet, and the second pore volume of the first sheet are shown as the specific surface area of the carbon material of the first region, the first pore volume of the first region, and the second pore volume of the first region, respectively. In addition, in Table 1, the specific surface area of the carbon material of the second sheet, the first pore volume of the second sheet, and the second pore volume of the second sheet are shown as the specific surface area of the carbon material of the second region, the first pore volume of the second region, and the second pore volume of the second region, respectively.

Methods for the measurements and the test conducted on samples 1 to 9, described above, will be described specifically below. That is, the method for measuring the specific surface area of the carbon material of each of the first sheet and the second sheet, the method for measuring the pore diameter distribution, the first pore volume, and the second pore volume of each of the first sheet and the second sheet, and the method for conducting the discharge test on the air battery will be described.

Specific Surface Area

The specific surface area of each of the carbon materials used to produce the first sheet and the second sheet was determined using the BET method, based on nitrogen adsorption measurement, prior to production of the first sheet and the second sheet. In the case that two or more carbon materials were used to produce a single sheet, the two or more carbon materials were thoroughly mixed and, in that state, the specific surface area was measured.

Pore Diameter Distribution, First Pore Volume, and Second Pore Volume

A mercury porosimetry measurement was performed on the first sheet and the second sheet, and thus the pore diameter distribution was determined and also the first pore volume and the second pore volume were determined.

Discharge Test

After the air battery was held under an atmosphere of oxygen for 20 minutes or more, the discharge test was conducted. For the test, the current density was 0.2 mA/cm$^2$ and the discharge cutoff voltage was 2.0V.

TABLE 1

| | First region | | | | Second region | | | |
|---|---|---|---|---|---|---|---|---|
| Sample No. | Carbon material | Specific surface area [m$^2$/g] | First pore volume [cm$^3$/g] | Second pore volume [cm$^3$/g] | Carbon material | Specific surface area [m$^2$/g] | First pore volume [cm$^3$/g] | Second pore volume [cm$^3$/g] | Discharge capacity [mAh] |
| 1 | Carbon A(*1) | 1364 | 0.94 | 2.46 | Carbon B(*2) | 39 | 0.25 | 1.81 | 32.1 |
| 2 | Carbon C(*3) | 1270 | 1.05 | 2.99 | Carbon B(*2) | 39 | 0.25 | 1.81 | 27.7 |
| 3 | Carbon C(*3) | 1270 | 1.05 | 2.99 | Carbon D(*4) | 800 | 0.77 | 2.59 | 22.3 |
| 4 | Carbon C(*3) | 1270 | 1.05 | 2.99 | Carbon C(*3) | 1270 | 1.05 | 2.99 | 21.9 |
| 5 | Carbon D(*4) | 800 | 0.77 | 2.59 | Carbon C(*3) | 1270 | 1.05 | 2.99 | 20.6 |
| 6 | Carbon B(*2) | 39 | 0.25 | 1.81 | Carbon A(*1) | 1364 | 0.94 | 2.46 | 19.6 |
| 7 | Carbon D(*4) | 800 | 0.77 | 2.59 | Carbon D(*4) | 800 | 0.77 | 2.59 | 18.1 |
| 8 | Carbon B(*2) | 39 | 0.25 | 1.81 | Carbon C(*3) | 1270 | 1.05 | 2.99 | 17.8 |
| 9 | Carbon B(*2) | 39 | 0.25 | 1.81 | Carbon B(*2) | 39 | 0.25 | 1.81 | 5.8 |

(*1)Carbon A: KETJENBLACK EC600JD + Porous Carbon CNovel P(3)010
(*2)Carbon B: Acetylene black HS-100L
(*3)Carbon C: KETJENBLACK EC600JD
(*4)Carbon D: KETJENBLACK ECP300J Based on the results shown in Table 1, an investigation was made into the influence of the specific surface area of the carbon material included in the first region and the specific surface area of the carbon material included in the second region on the discharge capacity.

A comparison was made between samples 6, 8, and 9, between which the specific surface area of the carbon material included in the first region was the same and in each of which the specific surface area of the carbon material included in the first region was less than or equal to the specific surface area of the carbon material included in the second region. The comparison revealed that, when the specific surface area of the carbon material included in the first region was the same between air batteries, the air battery in which a carbon material having a higher specific surface area was used as the carbon included in the second region had a higher discharge capacity than the other air batteries. This is believed to be because, when a carbon material having a higher specific surface area is used as the carbon included in the second region, the specific surface area of the included carbon materials over the entire electroconductive layer is increased. Note that improvement in discharge capacity due to an increased specific surface area of the included carbon materials over the entire electroconductive layer can be confirmed by comparing sample 9 with sample 2 and with sample 8.

The specific surface area of the carbon materials over the entire electroconductive layer of sample 2 was the same as that of sample 8. However, the degree of improvement in discharge capacity of sample 2 relative to sample 9 was greater than that of sample 8 relative to sample 9. In sample 2, the specific surface area of the carbon material included in the first region was higher than the specific surface area of the carbon material included in the second region, whereas, in the sample 8, the relationship was the opposite.

Further, sample 1 and sample 6 were compared with each other, sample 2 and sample 8 were compared with each other, and sample 3 and sample 5 were compared with each other. Each pair of the compared samples employed the same combination of two carbon materials used as the carbon included in the first region and the carbon included in the second region, but the carbon material for the first region and the carbon material for the second region were reversed between the paired samples. The air batteries of samples 1, 2, and 3 had a higher discharge capacity than the air batteries of sample 6, 8, and 5, respectively, which employed the same combination of carbon materials as samples 1, 2, and 3, respectively. In samples 1, 2, and 3, the specific surface area of the carbon material included in the first region was higher than the specific surface area of the carbon material included in the second region.

Furthermore, a comparison between sample 4 and sample 2 and between sample 4 and sample 3 revealed that samples 2 and 3 had a higher discharge capacity than sample 4. In samples 2 and 3, the specific surface area of the carbon material included in the second region was lower than the specific surface area of the carbon material included in the first region, whereas, in sample 4, the same carbon material was used for the first region and the second region. In this case, it was found that the lower the specific surface area of the carbon material included in the second region, the higher the discharge capacity.

The results described above indicate that a positive electrode in which the specific surface area of the carbon material included in the first region of the electroconductive layer is higher than the specific surface area of the carbon material included in the second region of the electroconductive layer enables a high discharge capacity to be achieved. In addition, the results indicate the following. In the case that the specific surface area of the carbon material included in the first region is higher than the specific surface area of the carbon material included in the second region and that the specific surface area of the carbon material included in the first region is the same between air batteries, the lower the specific surface area of the carbon material included in the second region, the higher the discharge capacity obtained.

The air battery of the present disclosure has a high discharge capacity. Hence, the air battery of the present disclosure is useful as a high-capacity cell.

What is claimed is:

1. A positive electrode for use in an air battery, the positive electrode comprising:
    a current collector including one or more openings; and
    an electroconductive layer including a porous body having pores, the porous body including a carbon material,
    wherein a second pore volume of a first region is greater than a second pore volume of a second region,
the electroconductive layer includes the first and second regions, the second region faces the one or more openings of the current collector, and the first region is located opposite to the second region with respect to a central plane containing midpoints in a thickness direction of the electroconductive layer, and
    wherein, among the pores in the electroconductive layer, pores each having a pore diameter of 4 nm or more and less than 100 nm are designated as first pores, and pores each having a pore diameter of 100 nm or more and 10 µm or less are designated as second pores, and a cumulative pore volume of the first pores is designated as a first pore volume, and a cumulative pore volume of the second pores is designated as the second pore volume.

2. The positive electrode according to claim 1, wherein each of the first region and the second region of the electroconductive layer includes part of the first pores and part of the second pores, and
in each of the first region and the second region of the electroconductive layer, the second pore volume is greater than the first pore volume.

3. The positive electrode according to claim 1, wherein the current collector includes:
    a base including a major surface; and
    one or more projections disposed on at least the major surface of the base,
the electroconductive layer is disposed on the major surface of the base, and
each of the one or more projections is at least partially within the electroconductive layer and is in direct contact with inside of the electroconductive layer.

4. An air battery comprising:
a positive electrode;
a negative electrode that occludes and releases metal ions; and
an electrolyte between the positive electrode and the negative electrode,
    the positive electrode comprising:
    a current collector including one or more openings; and
    an electroconductive layer including a porous body having pores, the porous body including a carbon material,
    wherein a second pore volume of a first region is greater than a second pore volume of a second region,
the electroconductive layer includes the first and second regions, the second region faces the one or more openings of the current collector, and the first region is located opposite to the second region with respect to a central plane containing midpoints in a thickness direction of the electroconductive layer, and
wherein, among the pores in the electroconductive layer, pores each having a pore diameter of 4 nm or more and less than 100 nm are designated as first pores, and pores each having a pore diameter of 100 nm or more and 10 µm or less are designated as second pores, and a cumulative pore volume of the first pores is designated as a first pore volume, and a cumulative pore volume of the second pores is designated as the second pore volume.

5. The air battery according to claim 4, wherein
each of the first region and the second region of the electroconductive layer includes part of the first pores and part of the second pores, and
in each of the first region and the second region of the electroconductive layer, the second pore volume is greater than the first pore volume.

6. The air battery according to claim 4, wherein
the current collector includes
    a base including a major surface and
    one or more projections disposed on at least the major surface of the base,
the electroconductive layer is disposed on the major surface of the base, and
each of the one or more projections is at least partially within the electroconductive layer and is in direct contact with inside of the electroconductive layer.

7. The air battery according to claim 4, wherein the electrolyte is a non-aqueous electrolyte solution, and
    a space between the positive electrode and the negative electrode is filled with the electrolyte.

* * * * *